United States Patent [19]

Franz

[11] Patent Number: 4,529,657

[45] Date of Patent: Jul. 16, 1985

[54] METHOD FOR LOWERING THE SURFACE ENERGY OF GLASS

[75] Inventor: Helmut Franz, Pittsburgh, Pa.

[73] Assignee: PPG Industries, Inc., Pittsburgh, Pa.

[21] Appl. No.: 355,275

[22] Filed: Mar. 5, 1982

Related U.S. Application Data

[63] Continuation-in-part of Ser. No. 910,255, May 30, 1978, abandoned.

[51] Int. Cl.³ .............................................. B32B 17/00
[52] U.S. Cl. .................................. 428/410; 65/30.13; 65/60.1; 65/111; 427/301; 428/432
[58] Field of Search ............... 427/226, 294, 343, 301, 427/374.1, 376.3, 376.6, 376.7, 383.3, 383.5, 399, 419.1, 419.2, 419.8, 426; 428/420, 410, 432, 426; 65/111, 30.13, 30.14, 60.4, 60.7, 60.1

[56] References Cited

U.S. PATENT DOCUMENTS

| | | | |
|---|---|---|---|
| 3,161,534 | 12/1964 | Dettre | 427/314 |
| 3,414,429 | 12/1968 | Bruss et al. | 427/226 |
| 3,460,960 | 8/1969 | Francel et al. | 428/432 |
| 3,743,491 | 7/1973 | Poole et al. | 427/314 |
| 3,920,869 | 11/1975 | Eckett et al. | 428/432 |
| 4,130,407 | 12/1978 | Ida | 427/383.5 |

*Primary Examiner*—Sadie L. Childs
*Attorney, Agent, or Firm*—Donna L. Seidel

[57] ABSTRACT

The surface energy of a glass article is reduced by adsorbing multivalent cations such as chromium onto a glass surface, then treating the surface with an aqueous solution of an alkali metal alkylate such as sodium stearate or oleate to strongly bond the long chain paraffinic or olefinic acid anion to the glass surface by ionic bonding of the alkylate anion to the adsorbed multivalent cation thereby rendering the glass surface non-wettable and lubricated.

6 Claims, No Drawings

METHOD FOR LOWERING THE SURFACE ENERGY OF GLASS

CROSS REFERENCE TO RELATED APPLICATION

This application is a continuation-in-part of U.S. application Ser. No. 910,255 filed May 30, 1978 by the same inventor, now abandoned.

BACKGROUND OF THE INVENTION

1. Field of the Invention

The present invention relates generally to the art of surface treatments for glass and more particularly to methods for lowering the surface energy of a glass article thereby rendering the surface non-wettable and lubricated.

2. The Prior Art

Ordinary glass comprises an acidic oxide such as silica and base metal oxides such as the oxides of alkali and alkaline earth metals. Ordinary soda-lime-silica glass is hydrophilic and absorbs moisture from the atmosphere. Since the base metal oxides are somewhat soluble in water, glass surfaces exposed to moisture are subjected to a dissolving action that tends to leach components out of the glass surface. Glass which is exposed to humid atmospheric conditions therefore has a tendency to discolor and develop a stain on its surface that reduces its transparency. The probable reactions of the glass surface are described as follows.

In the initial phase of weathering, a siliceous film of irregular thickness develops on the glass surface. The refractive index of the film differs from that of the underlying glass sheet because the film has a higher concentration of the alkali and alkaline earth metals. The result is discoloration which resembles a light film of oil in that it is multicolored, containing various shades of yellow, red, green and purple, referred to as iridescence.

As the weathering process continues, water absorbed by the hydrophilic glass surface leaches out sodium and calcium ions resulting in a solution of sodium and calcium hydroxides, a caustic solution capable of dissolving silicates present in the glass surface. The silicates form a powdery white scum on the glass surface producing a frosted appearance. The scum also contains sodium and calcium carbonates, presumably from the reaction of atmospheric carbon dioxide with the sodium and calcium ions leached out of the glass surface. While this silicate/carbonate scum may be washed off, a white, spotted discoloration and etching, referred to as stain, remains on the glass surface and can be removed only by grinding and polishing the glass surface.

The prior art discloses that iridescence and staining of glass sheets subjected to humid atmospheric conditions can be inhibited by contacting the glass surface with a slightly acidic agent having a pH between 4 and 7. The acidic agents, metallic salts of strong acids and weak metallic bases, may be sprayed in a solution onto the glass surface. Acidic gases such as $SO_2$ and $SO_3$ are also used to inhibit weathering effects on glass by treating the glass for about 30 minutes at temperatures of 300° to 600° C. in an atmosphere comprising 3 to 5 percent acidic gas. It is theorized that the acidic agents protect glass from weathering effects by neutralizing the alkali concentrated in the surface of the glass resulting in a neutral surface which does not dissolve to form a caustic solution as the glass surface absorbs moisture.

In U.S. Pat. No. 3,508,956, Moser et al note that the aforementioned acid treatment results in a light but permanent etch that decreases the initial transparency of the glass. Moser et al disclose a noncorrosive treatment whereby a glass surface is made resistant to iridescence, scum and stain by a residue of a basic solution of a metal ammino halide or a metal ammino nitrate on the glass surface. The method comprises contacting a glass surface at about 200° C. with a solution of ammonium hydroxide and an amphoteric metallic ammino compound which dries to form a protective residue.

In U.S. Pat. No. 3,420,693, Scholes et al disclose a method for treating glass by forming a dual protective coating on a virgin glass surface. First, a hot glass surface is exposed to a heat decomposable tin compound to form a tin oxide coating on the glass surface. Second, a lubricious organic compound is coated over the tin oxide coating. The dual protective coating improves the durability of glassware such as bottles and jars.

SUMMARY OF THE INVENTION

The present invention provides a treatment for a glass surface which lowers the surface energy and thereby improves its resistance to discoloration by rendering the surface non-wettable. In addition, this passivation of the glass surface reduces the adhesion of glass chips and dirt thereby maintaining a high quality glass surface throughout cutting, packing, transit, storage and use. Furthermore, the lubrication provided by this treatment facilitates scoring, prevents glass sheets from sticking together thereby minimizing the need for interleaving material, and also facilitates release of other materials from the glass surface.

The treatment involves first adsorbing multivalent cations, such as chromium, onto the glass surface and second reacting the cations with an alkali metal alkylate to form a nondissociating metal alkylate whereby the alkylate anion is bonded to the glass surface through the adsorbed multivalent cation. The alkylate, an anion of a long chain paraffinic or olefinic acid, provides a low energy surface which is non-wettable and lubricated.

DESCRIPTION OF THE PREFERRED EMBODIMENTS

The surface of a hydrophilic glass substrate such as a typical soda-lime-silica glass sheet is contacted with a solution of a salt containing multivalent cations which are adsorbed onto the glass surface. Such salts include the hydroxides of metals such as calcium, barium and strontium and the chlorides of metals such as chromium, aluminum, zinc, tin, zirconium, titanium, iron, copper and magnesium. The metal cations are chosen for their ability to be adsorbed onto a glass surface and to form insoluble alkylates. The anions are chosen such that the salts are soluble. The concentration of the salt in the solution may range from about 0.01 percent to saturation. Preferably, an aqueous solution of about 0.1 to 1.0 percent salt is used. Preferred salts include chromic, ferric and stannic chlorides, particularly chromic chloride. The solution may be used at ambient temperature (about 25° C.) or maintained at an elevated temperature up to the boiling point of the solution. A glass surface at ambient temperature is contacted with the solution for a sufficient time, typically a few minutes, for the metal cations to be adsorbed by the glass surface.

Following adsorption of the metal cations, the glass surface is contacted with a solution of an alkali metal alkylate. The alkylate may contain olefinic as well as saturated aliphatic acid anions, typically containing 10 to 20 carbon atoms, which are chosen for their hydrophobic characteristics. The metal cations are selected on the basis of the solubility of their alkylates. The concentration of the alkylate in the solution may range from about 0.01 percent to saturation. Preferably, an aqueous solution of about 0.1 to 1.0 percent alkylate is used. Preferred alkali metal alkylates include sodium stearate and sodium oleate. The solution is preferably maintained at an elevated temperature, typically from about 100° F. (about 38° C.) up to the boiling point of the solution (about 100° C.), which is below the melting point of the alkylate; e.g. 179° to 180° C. for calcium stearate. The metal-treated glass surface is contacted with the solution for a sufficient time, typically a few minutes, for the alkylate anions to react with the adsorbed multivalent metal cations to form an insoluble metal alkylate. Since the metal cations available for reaction with the alkylate anions are those adsorbed by the glass surface, an essentially monomolecular layer of alkylate is strongly bonded to the glass surface by ionic bonding to the adsorbed metal, and the alkylate anions are uniformly oriented to form a non-wetting surface layer.

The formation of an insoluble metal alkylate adhered to the glass surface through the adsorbed metal provides the glass substrate with a non-wettable, lubricating, low energy surface. The non-wetting characteristic may be determined quantitatively by measuring the contact angle of a water droplet and the lubricity qualitatively by touch or quantitatively by various friction tests. The contact angle, as measured by the sessile drop method using a modified captive bubble contact indicator manufactured by Lord Manufacturing, Inc. equipped with Geartner Scientific Co. goneometer optics, is greater than 65°, preferably greater than 75°, and most preferably greater than 80°. The present invention will be further understood from the descriptions of specific examples which follow.

EXAMPLE I

A flat glass surface at ambient temperature is contacted for 1 minute with an aqueous solution of 10 percent by weight chromic chloride at a temperature of 200° F. (about 93° C.). The metal-treated glass surface is then contacted for 1 minute with an aqueous solution of 10 percent by weight sodium stearate at a temperature of 200° F. (about 93° C.). The glass surface exhibits outstanding non-wetting properties and excellent lubricity.

EXAMPLE II

Glass surfaces are contacted as in Example I with solutions of the following salts: calcium hydroxide, cupric chloride, stannous chloride, stannic chloride, magnesium chloride, titanic sulfate, ferric chloride, and aluminum chloride. The metal treated surfaces are thereafter contacted as in Example I with a solution of sodium stearate. All treatments decreased the wettability and increased the lubricity of the glass surface. The adsorption of ferric and stannic ions, followed by the formation of an insoluble stearate, results in surfaces only slightly inferior to that of Example I.

EXAMPLE III

A glass surface is contacted with an aqueous solution of 1.0 percent chromic chloride for 1 minute at ambient temperature of about 75° F. (about 24° C.). The metal-treated surface is then contacted with an aqueous solution of 1.0 percent sodium stearate as in the previous examples. The resultant glass surface exhibits outstanding non-wetting properties and excellent lubricity.

EXAMPLE IV

A glass surface is contacted with an aqueous solution of 0.1 percent chromic chloride for 1 minute at ambient temperature. The metal-treated surface is then contacted with an aqueous solution of 0.1 percent sodium stearate at a temperature of about 200° F. (about 93° C.). The treated surface has better lubricity than surfaces treated with silicones or fluorosilicones and has a contact angle of 80°–85°.

The above exampes are offered to illustrate the present invention, the scope of which is limited only by the following claims.

I claim:

1. A method for treating a glass surface comprising the steps of:
   a. contacting the glass surface with a solution comprising multivalent metal cations capable of adsorption onto the glass surface and capable of formation of an insoluble alkylate at a temperature below the boiling point of the solution and for a time sufficient to result in adsorption of the metal cations by the glass; and
   b. contacting the glass surface, subsequent to the adsorption of multivalent cations, with a solution of a soluble alkylate compound comprising acid anions capable of reacting with the adsorbed metal cations to form an insoluble alkylate at a temperature below the boiling point of the solution and below the melting point of the alkylate compound.

2. The method according to claim 1, wherein the glass surface is contacted with an aqueous solution of a salt containing a multivalent cation selected from the group consisting of calcium, magnesium, barium, aluminum, strontium, chromium, copper, tin, iron, titanium, zirconium and zinc ions.

3. The method according to claim 2, wherein the salt is selected from the group consisting of chromic, stannic and ferric chlorides.

4. The method according to claim 2, wherein the glass surface is contacted, subsequent to the adsorption of a multivalent metal cation, with a solution of an alkali or alkaline earth metal alkylate wherein the acid anion comprises from 10 to 20 carbon atoms.

5. The method according to claim 1, claim 2 or claim 3, wherein the glass surface is contacted, subsequent to the adsorption of a multivalent metal cation, with a solution of an alkali metal alkylate selected from the group consisting of sodium stearate and sodium oleate.

6. A glass article produced according to the method of claim 5.

* * * * *